(12) United States Patent
Brennecke et al.

(10) Patent No.: US 9,371,189 B1
(45) Date of Patent: Jun. 21, 2016

(54) TELESCOPING BELT TIGHTENER WITH INTEGRATED BEARING HOUSING

(71) Applicant: Bryant Products, Inc., Ixonia, WI (US)

(72) Inventors: Todd A. Brennecke, Watertown, WI (US); Daniel M. Genz, Watertown, WI (US); David A. Roessler, Hartland, WI (US); Jeffrey C. Steiner, Menomonee Falls, WI (US)

(73) Assignee: Bryant Products, Inc., Ixonia, WI (US)

( * ) Notice: Subject to any disclaimer, the term of this patent is extended or adjusted under 35 U.S.C. 154(b) by 0 days.

(21) Appl. No.: 14/515,113

(22) Filed: Oct. 15, 2014

Related U.S. Application Data

(60) Provisional application No. 61/891,438, filed on Oct. 16, 2013.

(51) Int. Cl.
  *B65G 23/44* (2006.01)
  *B65G 15/60* (2006.01)
  *F16H 7/08* (2006.01)

(52) U.S. Cl.
  CPC .................................... *B65G 15/60* (2013.01)

(58) Field of Classification Search
  CPC ...................................................... B65G 23/44
  USPC ................... 198/816; 474/136, 137
  See application file for complete search history.

(56) References Cited

U.S. PATENT DOCUMENTS

| | | | |
|---|---|---|---|
| 2,519,203 A | 8/1950 | Stoecklin | |
| 2,939,571 A * | 6/1960 | Robertson | B65G 23/44 198/816 |
| 3,069,180 A | 12/1963 | Morlik | |
| 3,118,315 A * | 1/1964 | Loosli | F16H 7/14 198/816 |
| 3,284,114 A | 11/1966 | McCord et al. | |
| 3,832,910 A | 9/1974 | Bryant | |
| 3,837,689 A | 9/1974 | Csatlos | |
| 3,921,793 A * | 11/1975 | Hutchinson | B65G 23/44 198/813 |
| 4,650,224 A | 3/1987 | Smith | |
| 4,803,804 A | 2/1989 | Bryant | |
| 5,030,173 A | 7/1991 | Bryant | |
| 5,054,608 A | 10/1991 | Bryant | |
| 5,259,821 A | 11/1993 | Bryant | |
| 6,170,645 B1 * | 1/2001 | Mitchell | B65G 21/06 198/816 |
| 7,243,782 B2 * | 7/2007 | Schlagel | B65G 23/44 198/816 |
| 7,338,400 B2 * | 3/2008 | Pierjok | F16H 7/14 417/359 |
| 8,640,861 B2 * | 2/2014 | Chellberg | B65G 23/44 198/813 |
| 8,910,778 B1 * | 12/2014 | Francisco | B65G 39/16 198/814 |
| 8,967,373 B2 * | 3/2015 | Nils | B65G 15/62 198/816 |
| 2013/0049354 A1 | 2/2013 | Chase et al. | |

* cited by examiner

*Primary Examiner* — Douglas Hess
(74) *Attorney, Agent, or Firm* — Craig A. Fieschko, Esq.; DeWitt Ross & Stevens S.C.

(57) ABSTRACT

A belt tightening assembly for conveyor systems includes an elongated outer tube and an inner tube sized to be complementarily received in the outer tube. The inner tube retractably extends out of the outer tube to varying lengths. A bearing housing extends from a long end of the inner tube and is integrated with the inner tube such that the inner tube and bearing housing do not separate from each other during normal operation. A spherical bearing is inserted into the bearing housing, the belt tightener is secured to a roller of a conveyor system, and the assembly is secured to a side of a conveyor. A separate pillow block is not used, eliminating a number of collection points for contamination and lowering costs. Also, not requiring a pillow block to be fastened to the inner tube reduces shear forces that result from imprecise fastening.

20 Claims, 5 Drawing Sheets

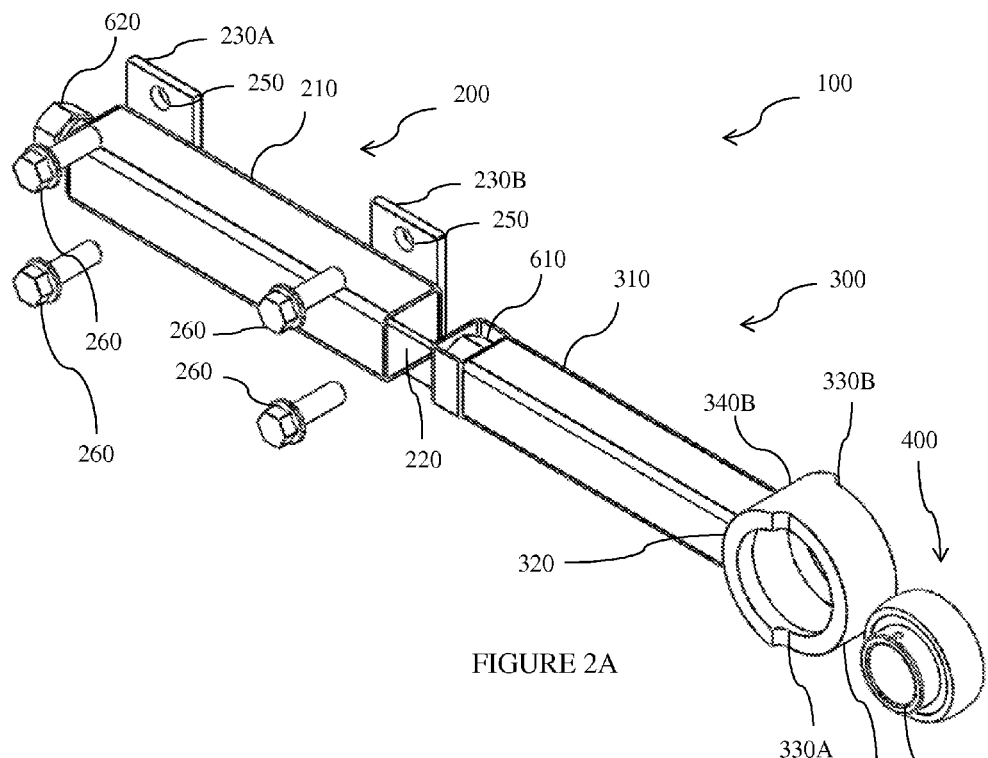
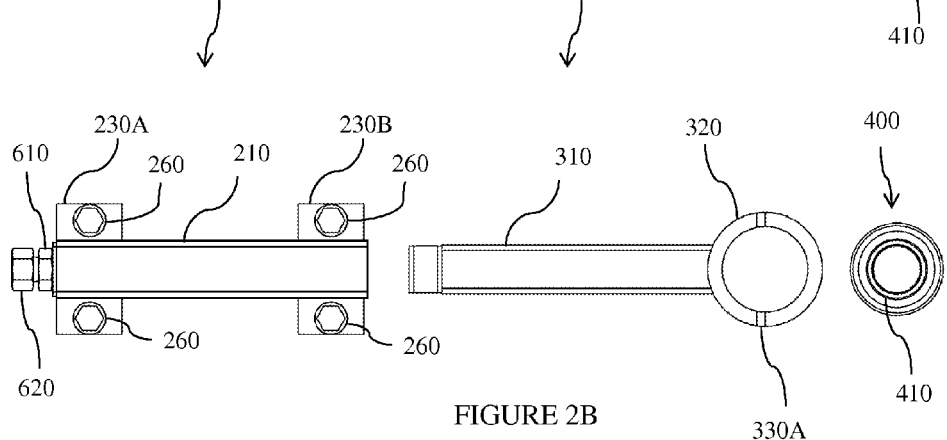
FIGURE 2A
FIGURE 2B

# TELESCOPING BELT TIGHTENER WITH INTEGRATED BEARING HOUSING

CROSS-REFERENCE TO RELATED APPLICATIONS

This application claims priority under 35 USC §119(e) to U.S. Provisional Patent Application 61/891,438 filed Oct. 16, 2013, the entirety of which is incorporated by reference herein.

FIELD OF THE INVENTION

This document concerns an invention relating generally to belt tightening assemblies for conveyor systems.

BACKGROUND OF THE INVENTION

A conveyor system generally includes a flexible belt (often made of rubber) that loops about two rollers: a front drive roller that powers the conveyor system, and a tail roller. As the rollers rotate, the conveyor can carry ("convey") an object placed on the belt. Over time, the flexible belt tends to stretch and deform, resulting in the belt slipping over the rollers and the conveyor system being unable to effectively move the belt. To avoid such slippage, the tail roller is often provided with an extendable and retractable belt tightener that applies tension to the belt so that there is enough friction for the drive pulley to move the belt. The belt tightener is often used to apply tension during the life of the conveyor system. Belt tighteners for conveyor and other endless belts are exemplified by the devices depicted in (for example): U.S. Pat. No. 3,832,910 to Bryant; U.S. Pat. No. 4,803,804 to Bryant; U.S. Pat. No. 5,030,173 to Bryant; U.S. Pat. No. 5,054,608 to Bryant; and U.S. Pat. No. 5,259,821 to Bryant (the entireties of these patents being incorporated herein by reference).

As shown in FIGS. 1A and 1B, a conventional belt tightener 1 includes a "take-up" having an elongated inner sleeve/tube 5 of lesser diameter that extends from and retracts into a "body" 10 (an elongated outer sleeve/tube) of larger diameter. Conventional belt tighteners also include a pillow block 15 that is secured to the take-up 5 via a bearing plate/mounting plate 20. The pillow block 15 receives a bearing 25 through which a roller shaft may pass.

The design of tightener 1 has been in use for many years, and it suffers from several noteworthy disadvantages. Mounting pillow blocks to standard bearing plates requires nuts and bolts. Such nuts and bolts are collection points for contamination and bacteria, which is undesirable especially in food-grade applications. Also, imperfect installation of the pillow block will place parts out of alignment (even if only slightly), subjecting the components to shear forces, increasing wear-and-tear, and wasting energy.

These and other failures are addressed by the exemplary improved belt tighteners discussed below and depicted in the attached figures.

SUMMARY OF THE INVENTION

The invention, which is defined by the claims set forth at the end of this document, is directed to telescoping tighteners for conveyor systems which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 2A, 2B, and 5, an exemplary telescoping belt tightening assembly 100 for conveyor systems 500 includes an outer tube assembly 200 and a belt tightener 300. The outer tube assembly 200 includes an elongated outer tube 210 with an opening 220 extending therethrough, and the belt tightener 300 includes an inner tube 310 sized to be complementarily received in the opening 220 of the outer tube 210. The inner tube 310 telescopes with respect to the outer tube 210, extending out of the outer tube 210 to varying degrees; that is, the inner tube 310 can be inserted into the outer tube 210 and retracted therefrom. The belt tightener 300 also includes a bearing housing 320 that extends from a long end of the inner tube 310. The bearing housing 320 is integrated with the inner tube 310 such that the inner tube 310 and bearing housing 320 do not separate from each other during normal operation. Referring also to FIGS. 4A and 4B, the bearing housing 320 receives a spherical bearing 400, which is secured to a roller 520 of a conveyor system 500. The belt tightener 300 can then be secured to a side frame 530 of a conveyor 510 (see FIG. 5), allowing the position of the roller 520 to be adjusted by adjusting the degree to which the inner tube 310 extends out of the outer tube 210.

Assembly of the belt tightener 300 does not require securing a separate pillow block 15 to the inner tube 310, which eliminates the need for a pillow block 15, a mounting plate 20, and nuts and bolts. Because a pillow block 15 (which receives the bearing) is not mounted by the user, the belt tightener 300 will not be assembled out of alignment with the outer tube assembly 200. This helps reduce unnecessary shear forces that increase wear-and-tear and waste energy. Eliminating the need for fasteners used to mount a pillow block 15 eliminates unnecessary collection points for contamination and bacteria, making the belt tightener 300 better suited for food-grade applications. Moreover, the need for fewer components helps simplify installation and lower costs. Additionally, the smaller footprint of the belt tightener 300 makes the belt tightener 300 easier to use and manipulate where space is limited. Further advantages and features of the invention will be apparent from the remainder of this document in conjunction with the associated drawings.

BRIEF DESCRIPTION OF THE DRAWINGS

FIG. 2A is an exploded view of an exemplary belt tightener assembly 100 with a belt tightener 300 having an integrated bearing housing 320, eliminating the need for a pillow block 15, mounting plate 20, and nuts and bolts for securing the pillow block 15 to the mounting plate 20. FIG. 2B is an alternative view of the exemplary belt tightener assembly 100 of FIG. 2A.

DETAILED DESCRIPTION OF PREFERRED VERSIONS OF THE INVENTION

Figure 1A:
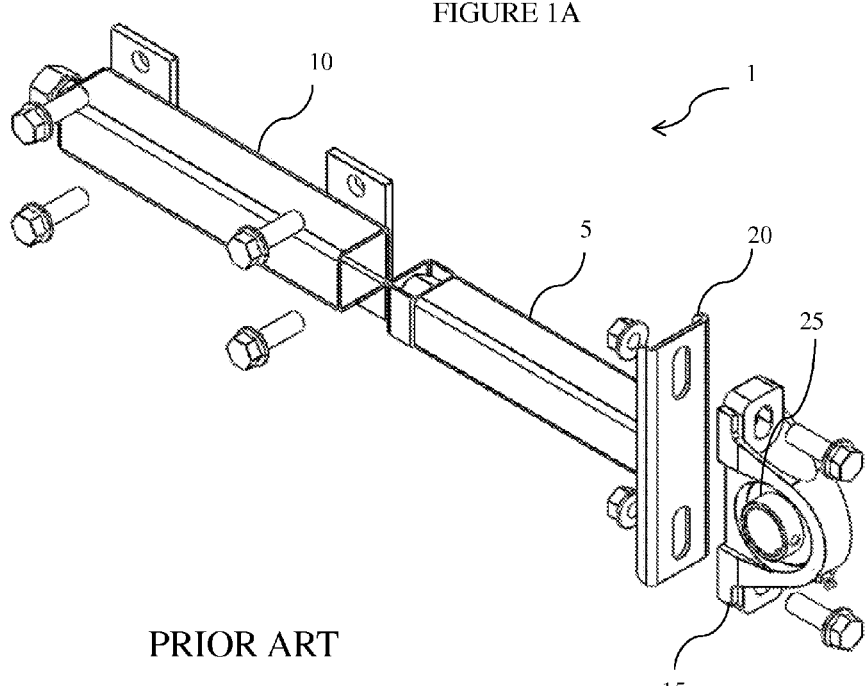
FIG. 1A is an exploded view of a conventional belt tightener assembly 1 with a pillow block 15, a mounting plate 20, and nuts and bolts for securing the pillow block 15 to the mounting plate 20.
Figure 1B:
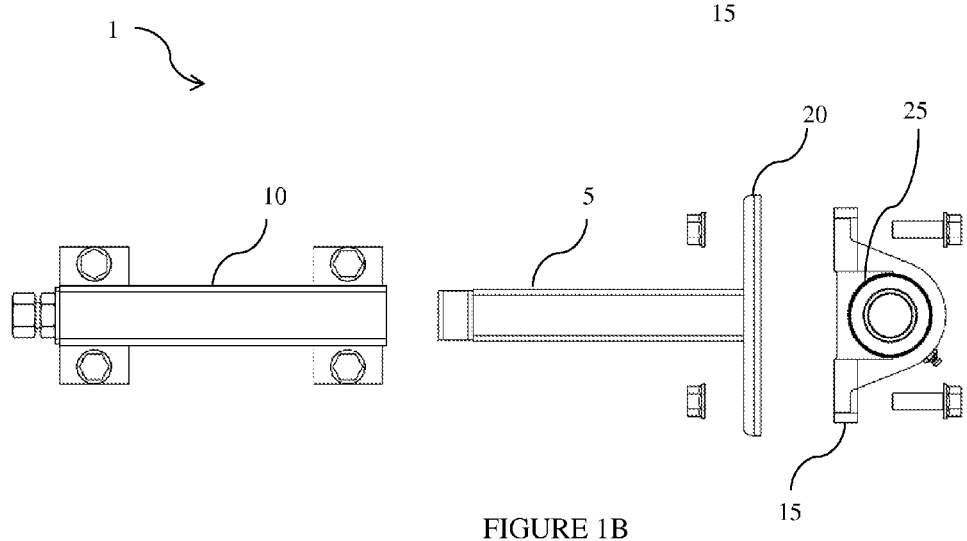
FIG. 1B is an alternative view of the conventional belt tightener assembly 1 of FIG. 1A.

Continuing the discussion in the above Summary of the Invention section, the belt tightener assembly 100 may be secured to a conveyor system 500 via mounting wings/feet that are bolted to the conveyor 510. The outer tube assembly 200 further includes a first mounting wing 230A and a second mounting wing 230B extending from opposing ends of the outer tube 210. Each of the first and second mounting wings 230A, 230B includes a pair of apertures 250 formed therein for receiving a fastener 260 when the outer tube assembly 200 is secured to a conveyor system 500. The apertures 250 are preferably situated on opposing sides of the outer tube 210. Alternatively or additionally, the belt tightener 300 may be secured to a conveyor system 500 via a set of bolts or studs that extend from (for example) the backside of the outer tube 210.

The belt tightener assembly 100 also includes an adjusting unit having (for example) an adjuster rod 610 and ball screw 620 to allow the inner tube 310 to telescope with respect to the outer tube 210; that is, to allow the inner tube 310 to retractably extend out of the outer tube 210 to varying lengths. The bearing housing 320 is well-suited to receiving a spherical bearing 400 therein, the spherical bearing 400 having an inner ring 410 for receiving a roller shaft 540. Spherical bearings 400 allow for vertical and horizontal alignment from one inner tube 310 to another. An in-line design allows all forces to be applied down the axis of the inner tube 310.

The bearing housing 320 preferably includes a first indent 330A and optionally a second indent 330B. The first indent 330A and the second indent 330B are formed as a first circumferential segment 340A and a second circumferential segment 340B having different widths: the first circumferential segment has a first segment width, and the second circumferential segment has a second segment width that is smaller than the first segment width. In other words, part of the bearing housing 320 is thinner (or "shorter" if the bearing housing 320 is considered to be a hollow cylinder) than another part. This provides better access to certain tools (such as a wrench) when the bearing 400 and roller shaft 540 are being assembled and disassembled.

The bearing housing 320 can removably receive any suitable spherical bearing; the bearing housing 320 in the figures allows edgewise insertion of the bearing 400, followed by rotation of the bearing 400 so that its bore is coaxial with the bore of the bearing housing 320. A suitable bearing has an outer diameter that closely interfits with the inner diameter on the bearing housing 320 to accommodate misalignment. If necessary, an annular sleeve can be situated between the bearing and the housing to allow a better fit between the bearing and housing. With a bearing 400 change-over, there is no need to unbolt a pillow block 15; the user can simply rotate the bearing 400 ninety degrees within the bearing housing 320 and remove the bearing 400. Bearing bores accommodated by preferred versions is 0.5 inch to 10.5 inches. The user can use bearings from various manufacturers available from different distributors; the user is not restricted to the specific characteristics of one manufacturer's bearings.

Figure 3A:
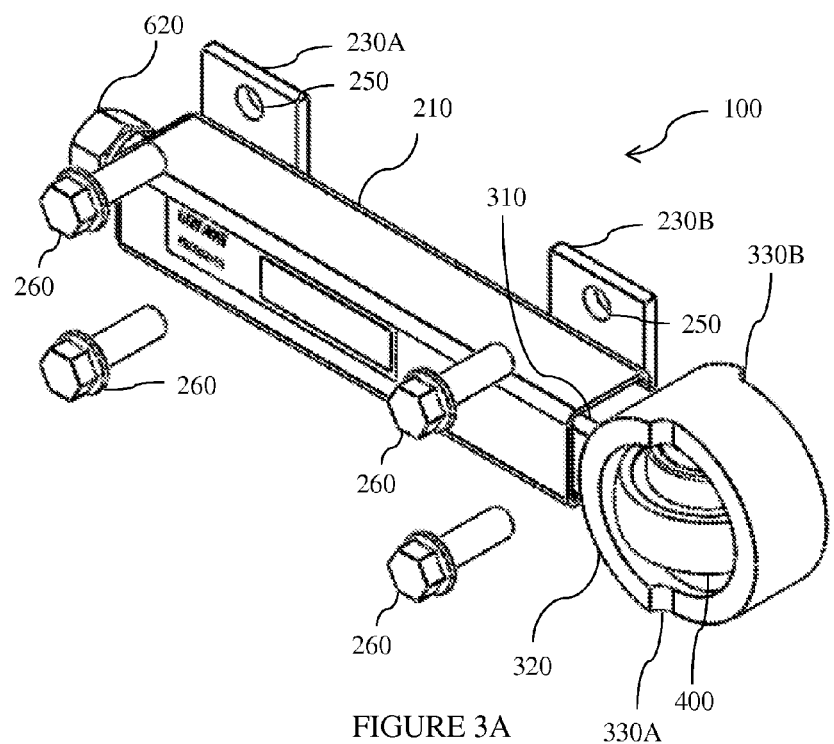
FIG. 3A is a perspective view of the exemplary belt tightener assembly 100 of FIG. 2A with an inner tube 310 of the belt tightener 300 inserted into the outer tube 210, and a spherical bearing 400 inserted edgewise into the bearing housing 320.
Figure 3B:
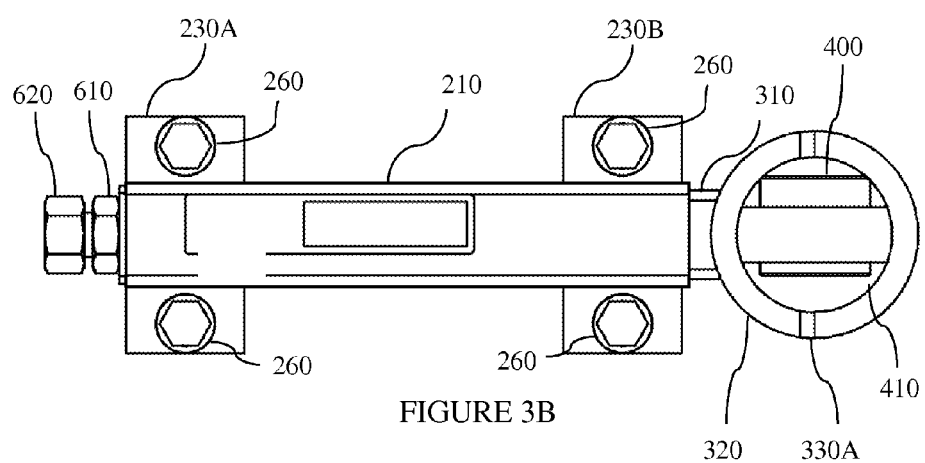
FIG. 3B is an alternative view of the exemplary belt tightener assembly 100 of FIG. 3A.
Figure 4A:
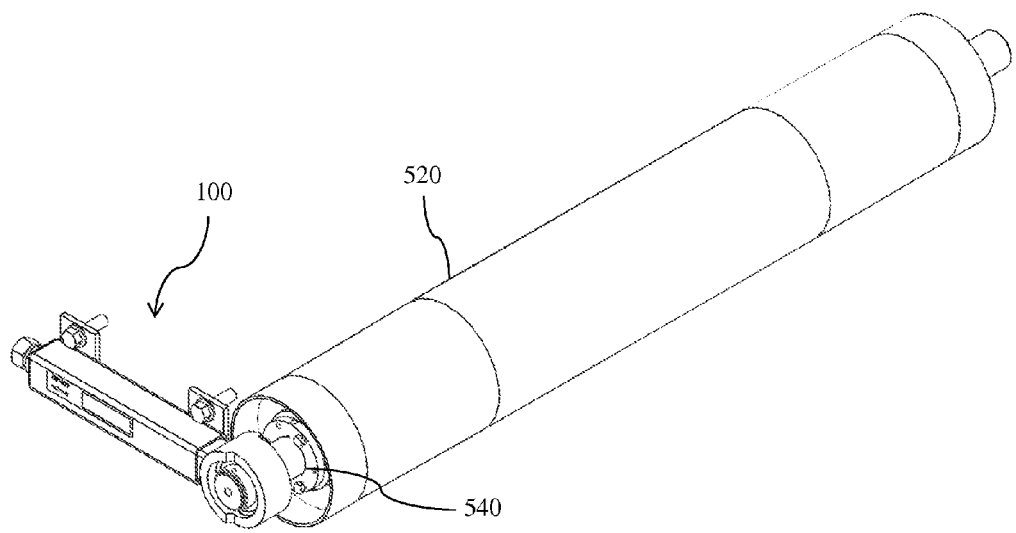
FIG. 4A is a perspective view of the exemplary belt tightener assembly 100 of FIG. 3A with a roller shaft 540 of a roller 520 engaging a bearing 400 in the bearing housing 320.
Figure 4B:
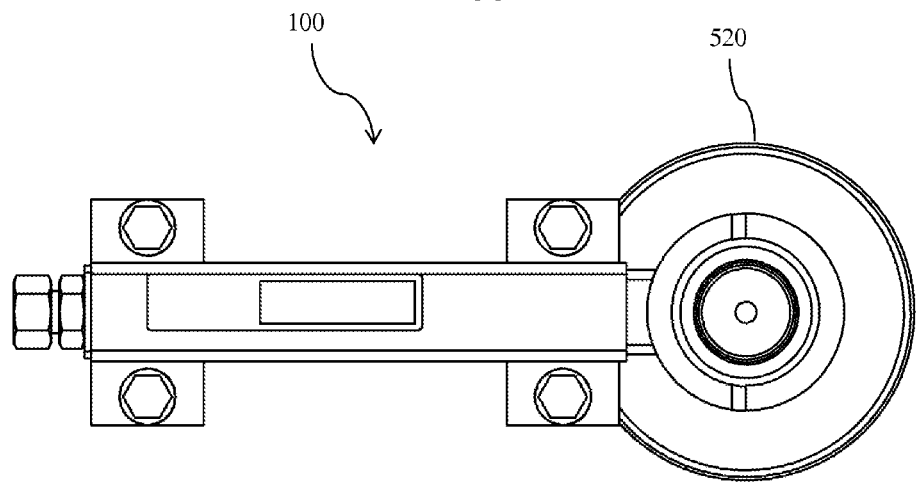
FIG. 4B is an alternative view of the exemplary belt tightener assembly 100 of FIG. 4A.
Figure 5:
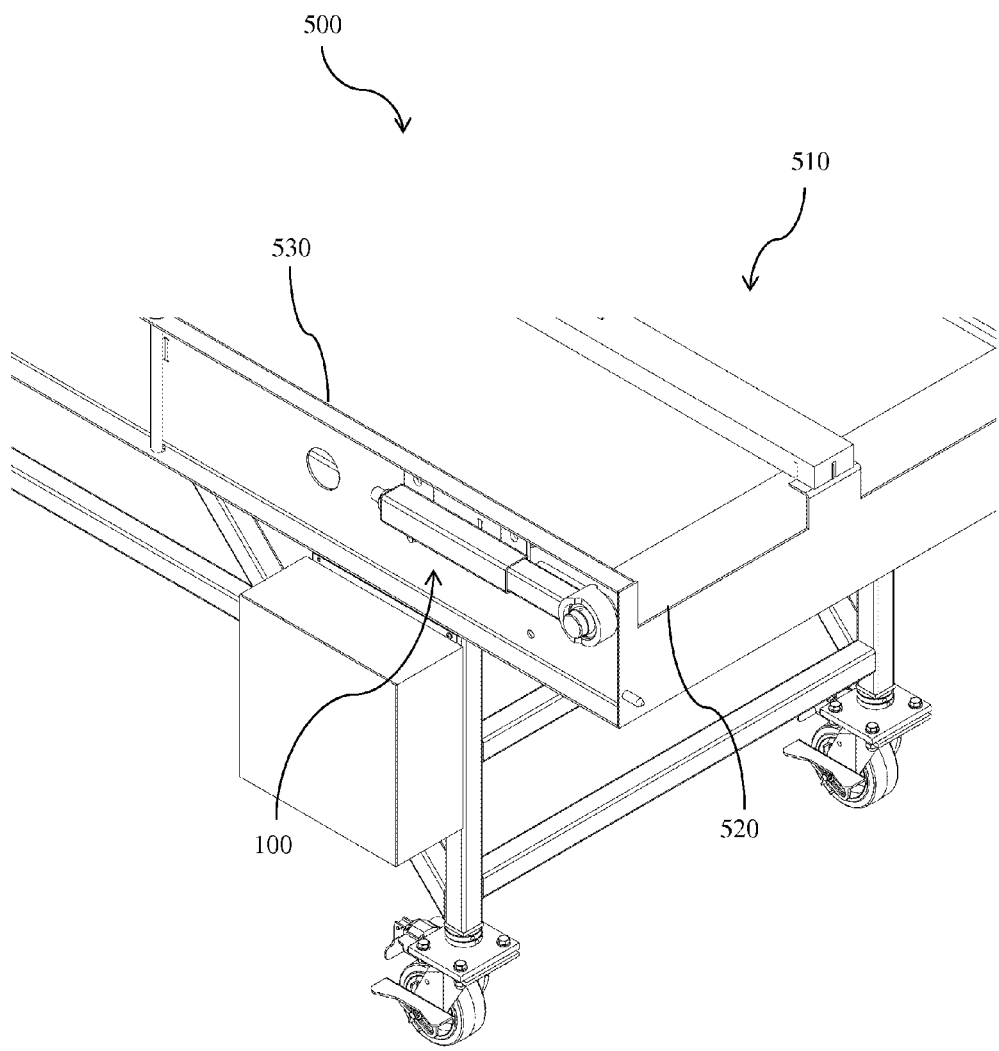
FIG. 5 is a perspective view of the exemplary belt tightener assembly 100 of FIG. 4A installed in a conveyor 510, with the outer tube 210 secured to a side of conveyor 510 frame.

An exemplary method of using the belt tightening assembly 100 in a conveyor system 500 involves installation of the outer tube assembly 200 and belt tightener 300 in a conveyor system 500. The inner tube 310 of the belt tightener 300 can be slid or inserted into the outer tube 210 of the outer tube assembly 200. The spherical bearing 400 can be situated in the bearing housing 320 by inserting the spherical bearing 400 into the bearing housing 320 edgewise (see FIGS. 3A and 3B), and rotating the spherical bearing 400 such that the inner ring 410 of the spherical bearing 400 is aligned to allow a roller shaft 540 to be installed perpendicularly with respect to the long axis of the inner tube 310 (see FIGS. 4A and 4B). The roller shaft 540 of the roller 520 can be secured to the spherical bearing 400, and the outer tube assembly 200 can be secured to a side frame 530 of the conveyor 510 using fasteners 260 in the first and second mounting wings 230A, 230B. After installation, if the position of the roller 520 is to be adjusted, the inner tube 310 may be pulled out of the outer tube 210 such that the inner tube 310 extends farther out of the outer tube 210, increasing the distance between the bearing housing 320 and the outer tube 210.

The one-piece inner tube 310 and bearing housing 320 can be manufactured by (for example) being machined and welded. The assembly can be made of (for example) carbon steel or stainless materials. Because the bearing housing 320 is not removable from the inner tube 310 (during normal operation), imprecise fastening of the bearing housing 320 to the inner tube 310 is avoided.

As already discussed, the above improved belt tightener assembly 100 has many advantages. For example, the assembly 100 serves as a substitute for the combination of a mounting plate 20 and pillow block 15. System costs are lowered because a mounting plate 20 and pillow block 15 need not be purchased; there is no need to purchase separate components. A user need only purchase a suitable bearing 400 because the bearing housing 320 is integrated with the inner tube 310. Additionally, the potential for bending of pillow blocks 15 and mounting plates 20 during shipment and use is eliminated. Moreover, not using a mounting plate 20 (and, for example, the nuts and bolts used in mounting) reduces the collection points (for contaminants, bacteria, etc.) in (for example) wash down applications.

The improved belt tightener assembly 100 satisfies a long-felt but unsatisfied need for less costly, more convenient tighteners that reduce shear forces and that are well suited especially for food grade applications. This need has persisted in the field, as conventional tighteners 1 have not significantly changed over the years. The need for a design that (for example) reduces the number of connectors/fasteners required is evidenced by food grade standards that discourage the use of nuts and bolts because nuts and bolts serve as collection points for contamination and bacteria. Such unmet needs are satisfied by exemplary versions of this invention.

Initially, it must be kept in mind that the belt tightening assembly shown in the accompanying drawings and discussed above are merely exemplary, and may assume a wide variety of configurations and dimensions different from those noted, and may use components different from those noted. It should also be understood that terms referring to orientation and position are relative terms rather than absolute ones; thus, such terms should be regarded as words of convenience, rather than limiting terms. Further, the invention is not intended to be limited to these versions. Rather, the scope of rights to the invention is limited only by the claims set out below, and the invention encompasses all different versions that fall literally or equivalently within the scope of these claims.

What is claimed is:

1. A telescoping belt tightening assembly for conveyor systems, the belt tightening assembly including:
   a. an outer tube assembly having an elongated outer tube with an opening extending therethrough; and
   b. a belt tightener having:
      i. an inner tube sized to be complementarily received in the opening of the outer tube, wherein the inner tube is adjustably securable to the outer tube such that the inner tube extends out of the outer tube to varying lengths; and
      ii. a bearing housing extending from a long end of the inner tube, the bearing housing being:
         1) substantially a hollow cylinder with:
            a) a first circumferential segment having a first segment width; and
            b) a second circumferential segment having a second segment width that is smaller than the first segment width;
         2) integrally formed with the inner tube such that the inner tube and bearing housing do not separate from each other during normal operation.

2. The assembly of claim 1 wherein the bearing housing is configured to receive a spherical bearing therein.

3. The assembly of claim 1 wherein the assembly excludes:
   a. a removably securable pillow block for receiving a bearing; and
   b. fasteners for securing a pillow block to the inner tube.

4. The assembly of claim 1 wherein the belt tightener excludes a mounting wing situated between the inner tube and the bearing housing.

5. The assembly of claim 1 wherein the bearing housing is configured to receive a spherical bearing therein, the spherical bearing having an inner ring for receiving a roller shaft.

6. The assembly of claim 5 wherein the assembly excludes:
   a. a removably securable pillow block for receiving a bearing; and
   b. fasteners for securing a pillow block to the inner tube.

7. The assembly of claim 1 wherein the assembly consists of:
   a. the outer tube assembly;
   b. the belt tightener;
   c. a spherical bearing complementarily receivable in the bearing housing of the belt tightener; and
   d. fasteners for securing the outer tube assembly to a side of a conveyor.

8. The assembly of claim 1 wherein the outer tube assembly further includes a mounting wing extending from the outer tube, the mounting wing having an aperture formed therein for receiving a fastener.

9. The assembly of claim 1 further including an adjusting unit for allowing the inner tube to retractably telescope out of the outer tube to varying lengths.

10. The assembly of claim 9 wherein the adjusting unit includes an adjuster rod and a ball screw.

11. The assembly of claim 1 further including a spherical bearing removably fittable in the bearing housing.

12. The assembly of claim 11 wherein the spherical bearing includes an inner ring configured to securely receive a roller shaft therein.

13. The assembly of claim 1 further including:
   a. a spherical bearing receivable in the bearing housing, the spherical bearing having an inner ring; and
   b. a roller having a roller shaft that is complementarily receivable through the inner ring of the spherical bearing.

14. The assembly of claim 13 further including a conveyor, wherein:
   a. the roller is installable at an end of the conveyor;
   b. the outer tube assembly is securable to a side of the conveyor;
   c. the inner tube of the belt tightener is at least partly insertable into the outer tube; and
   d. the roller is securable to the bearing housing via the roller shaft and the spherical bearing.

15. A telescoping belt tightening assembly for conveyor systems,
   a. the belt tightening assembly including:
      i. an outer tube assembly having an elongated outer tube with an opening extending therethrough;
      ii. a belt tightener having:
         1) a telescoping inner tube that is complementarily receivable in the opening of the outer tube, wherein the inner tube is extendable out of the outer tube to varying lengths; and
         2) a bearing housing extending from a long end of the inner tube, the bearing housing being
            a) substantially a hollow cylinder with:
               i) a first circumferential segment having a first segment width; and
               ii) a second circumferential segment having a second segment width that is smaller than the first segment width;
            b) integrally formed with the inner tube such that the inner tube and bearing housing do not separate from each other during normal operation; and
      iii. a spherical bearing that is removably securable in the bearing housing, the spherical bearing having an inner ring;
   b. wherein the outer tube assembly and belt tightener are installable in a conveyor system by:
      i. sliding the inner tube of the belt tightener into the outer tube of the outer tube assembly;
      ii. situating the spherical bearing in the bearing housing;
      iii. securing a roller shaft of a roller to the spherical bearing; and
      iv. securing the outer tube assembly to a side of the conveyor.

16. The assembly of claim 15 wherein the outer tube assembly further includes a mounting wing extending from the outer tube,
   a. the mounting wing having a pair of apertures formed therein,
   b. the pair of apertures being situated on opposing sides of the outer tube.

17. A method of using a telescoping belt tightening assembly in a conveyor system,
   a. the belt tightening assembly including:
      i. an outer tube assembly having an elongated outer tube with an opening extending therethrough;
      ii. a belt tightener having:
         1) a telescoping inner tube that is complementarily receivable in the opening of the outer tube, wherein the inner tube is extendable out of the outer tube to varying lengths; and
         2) a bearing housing extending from a long end of the inner tube, the bearing housing being integrally formed with the inner tube such that the inner tube and bearing housing do not separate from each other during normal operation; and iii. a spherical bearing that is removably securable in the bearing housing, the spherical bearing having an inner ring;
b. wherein the method includes the steps of:
   i. sliding the inner tube of the belt tightener into the outer tube of the outer tube assembly;
   ii. situating the spherical bearing in the bearing housing;
   iii. securing a roller shaft of a roller to the spherical bearing; and
   iv. securing the outer tube assembly to a side of the conveyor.

18. The method of claim 17 wherein the outer tube assembly and belt tightener are installed in a conveyor system without securing to the inner tube a removable pillow block for receiving the bearing therein.

19. The method of claim 17 wherein the spherical bearing is situated in the bearing housing by:
a. inserting the spherical bearing into the bearing housing edgewise; and
b. rotating the spherical bearing such that the inner ring of the spherical bearing is aligned so as to receive a roller shaft perpendicularly with respect to the long axis of the inner tube.

20. The method of claim 17 wherein:
a. the inner tube extends into the outer tube a first distance when the outer tube assembly and belt tightener are first installed in the conveyor system;
b. the method further includes the step of pulling the inner tube out of the outer tube such that the inner tube extends into the outer tube a second distance that is smaller than the first distance.

* * * * *